US012801917B2

(12) United States Patent
Bingham et al.

(10) Patent No.: US 12,801,917 B2
(45) Date of Patent: Nov. 17, 2026

(54) METHOD AND SYSTEM FOR OPTIMIZING ACTIVATION FUNCTIONS IN NEURAL NETWORKS

(71) Applicant: Cognizant Technology Solutions US Corp, Teaneck, NJ (US)

(72) Inventors: Garrett Bingham, Palo Alto, CA (US); Risto Miikkulainen, Stanford, CA (US)

(73) Assignee: COGNIZANT TECHNOLOGY SOLUTIONS US CORP, Teaneck, NJ (US)

( * ) Notice: Subject to any disclaimer, the term of this patent is extended or adjusted under 35 U.S.C. 154(b) by 538 days.

(21) Appl. No.: 18/537,924

(22) Filed: Dec. 13, 2023

(65) Prior Publication Data

US 2025/0200352 A1 Jun. 19, 2025

(51) Int. Cl.
*G06N 3/048* (2023.01)
*G06N 3/08* (2023.01)

(52) U.S. Cl.
CPC .................................... *G06N 3/08* (2013.01)

(58) Field of Classification Search
CPC ...................................................... G06N 3/048
See application file for complete search history.

(56) References Cited

U.S. PATENT DOCUMENTS 11,475,309 B2 10/2022 Shamir
2020/0005143 A1* 1/2020 Zamora Esquivel .. G06N 3/047
2021/0133565 A1 5/2021 Shamir et al.
2024/0176996 A1* 5/2024 Seak ...................... G06N 3/105
2024/0311622 A1* 9/2024 Keskin .................. G06N 3/045

FOREIGN PATENT DOCUMENTS

EP 4184391 A1 5/2023

OTHER PUBLICATIONS

Lawson Oliveira Lima, "Multilayer Perceptron-based Surrogate Models for Finite Element Analysis", Nov. 17, 2022, https://arxiv.org/pdf/2211.09380.pdf.

(Continued)

*Primary Examiner* — Grace Park
(74) *Attorney, Agent, or Firm* — CANTOR COLBURN LLP

(57) ABSTRACT

A method and system for optimizing activation functions to improve efficiency of neural networks is provided. Activation function benchmark datasets are created by training neural network architectures with a plurality of activation functions. The activation function benchmark datasets comprise results obtained through the training for various tasks. Features indicative of performance of the activation functions in the activation benchmark datasets are identified. A metric space is created by analyzing identified features of activation functions, which is a low-dimensional representation of the activation functions. Activation functions are optimized based on metric space by employing dimensionality reduction techniques to visualize the metric space. Subsequently, characteristics of optimized activation functions which are predictive of performance are determined. Activation functions are selected from optimized activation, which are applied to improve real-world tasks carried out by neural networks.

25 Claims, 11 Drawing Sheets

(56) References Cited

OTHER PUBLICATIONS

Shreyas Subramanian, “Building a deep neural net-based surrogate function for global optimization using PyTorch on Amazon SageMaker”, https://aws.amazon.com/blogs/machine-learning/building-a-deep-neural-net-based-surrogate-function-for-global-optimization-using-pytorch-on-amazon-sagemaker/, Sep. 16, 2019.

Weili Guo, “Fisher Information Matrix of Unipolar Activation Function-Based Multilayer Perceptrons”, Jun. 8, 2018, URL: https://pubmed.ncbi.nlm.nih.gov/29994240/.

Yoshinari Takeishi, “Approximate Spectral Decomposition of Fisher Information Matrix for Simple ReLU Networks”, https://arxiv.org/pdf/2111.15256.pdf, Feb. 28, 2023.

* cited by examiner

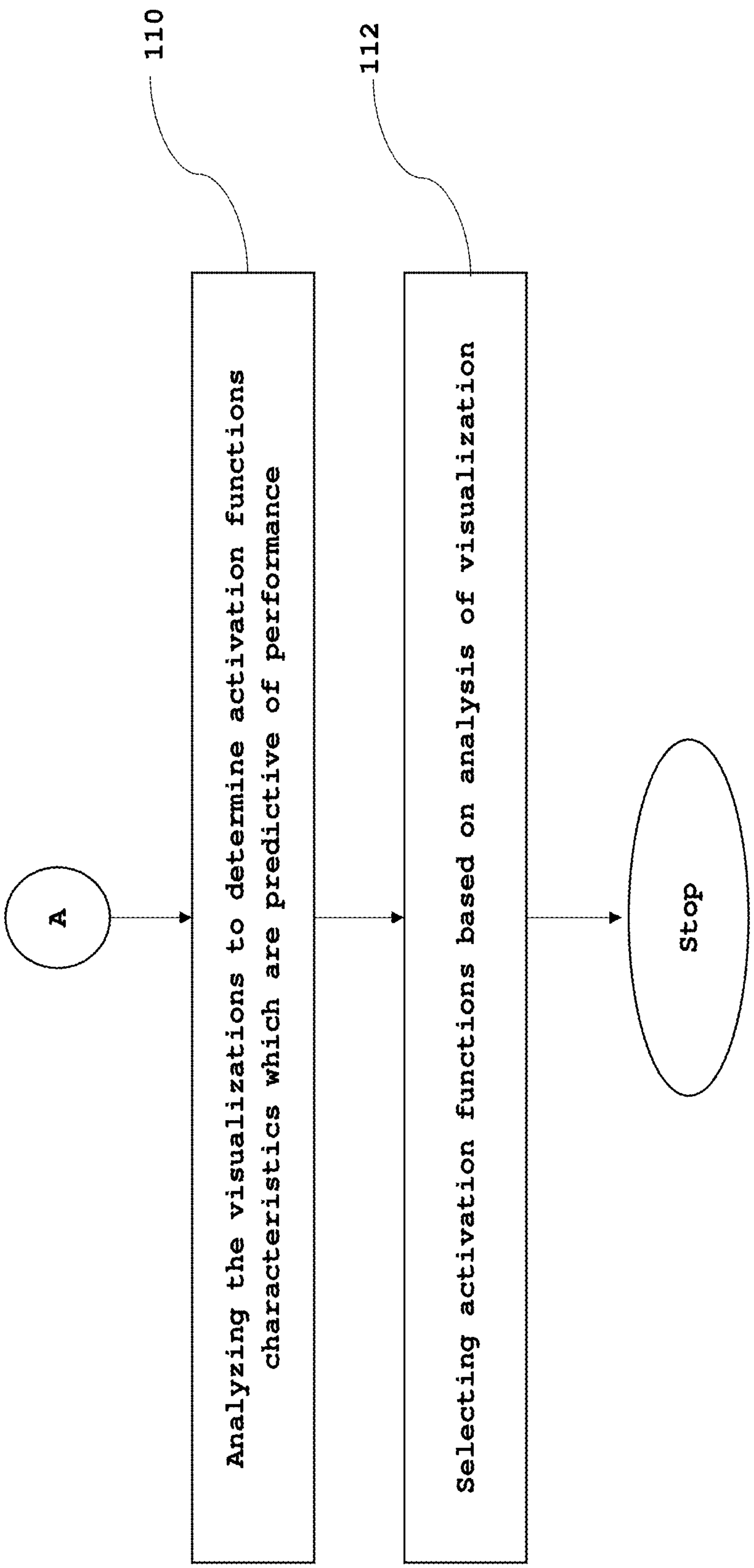
FIG. 1, Cont.

METHOD AND SYSTEM FOR OPTIMIZING ACTIVATION FUNCTIONS IN NEURAL NETWORKS

FIELD OF THE INVENTION

The present invention relates generally to the field of neural networks, and more particularly, to a method and system for optimizing activation functions to improve performance of neural networks.

BACKGROUND OF THE INVENTION

Activation functions are an important choice in neural network design. They determine how the outputs of neurons are transformed into inputs for subsequent layers. Activation functions can have a significant impact on the performance of neural networks, and researchers have designed a variety of activation functions with different properties.

Well-constructed activation functions can markedly enhance neural network performance across diverse machine learning tasks. However, it is difficult for humans to construct optimal activation functions for all machine learning tasks. Automated methods can evaluate thousands of unique functions, and as a result, often optimize better activation functions than those designed by humans. However, such automated approaches have their own limitations. This limitation results in computationally inefficient ad hoc algorithms that may not scale to large models and datasets. Further, current activation function search algorithms are also expensive, making it difficult to optimize activation functions for new tasks.

In light of the aforementioned drawbacks, there is a need for a system and a method which provides for optimization of activation functions to improve performance of neural networks.

SUMMARY OF THE INVENTION

In various embodiments of the present invention, a method for optimizing activation functions to improve efficiency of neural networks is provided. The method is implemented by a processor executing instructions stored in a memory. The method comprises creating activation function benchmark datasets by training one or more neural network architectures with a plurality of activation functions. The activation function benchmark datasets comprise results obtained through training of the neural network architectures for various tasks and are indicative of performance of the activation functions on specific tasks. The method further comprises identifying one or more features indicative of performance of the activation functions in the activation benchmark datasets. Further, the method comprises creating a metric space by analyzing the identified features of the activation functions. The metric space is a low-dimensional representation of the activation functions, is representative of informative features associated with the activation functions and has a predefined distance metric. The method further comprises optimizing the activation functions based on the metric space by employing dimensionality reduction techniques to visualize the metric space. The visualization of metric space shows clusters of high performing activation functions segregated from poorly performing activation functions. The method further comprises determining characteristics of the optimized activation functions which are predictive of performance of feature sets of the optimized activation function. Finally, the method comprises selecting activation functions from the optimized activation, wherein the selected activation functions are applied to improve real-world tasks carried out by neural networks.

In various embodiments of the present invention, a system optimizing activation functions to improve efficiency of neural networks is provided. The system comprises a memory storing program instructions, a processor executing instructions stored in the memory and an activation function optimization engine executed by the processor and configured to create activation function benchmark datasets by training one or more neural network architectures with a plurality of activation functions. The activation function optimization engine identifies one or more features indicative of performance of the activation functions in the activation benchmark datasets. The activation function optimization engine creates a metric space by analyzing the identified features of the activation function in the benchmark datasets. The metric space is a low-dimensional representation of the activation functions, is representative of informative features associated with the activation functions and has a predefined distance metric. The activation function optimization engine further optimizes the activation functions based on the metric space by employing dimensionality reduction techniques to visualize the metric space. The visualization shows clusters of high performing activation functions segregated from poorly performing activation functions. The activation function optimization engine determines characteristics of the optimized activation functions which are predictive of performance of feature sets of the optimized activation function. The activation function optimization engine selects activation functions from the optimized activation functions based on the determination. The selected activation functions are applied to improve real-world tasks carried out by neural networks.

In various embodiments of the a computer program product is provided. The computer program product comprises a non-transitory computer-readable medium having computer program code stored thereon, the computer-readable program code comprising instructions that, when executed by a processor, causes the processor to create activation function benchmark datasets by training one or more neural network architectures with a plurality of activation functions. The processor identifies one or more features indicative of performance of the activation functions in the activation benchmark datasets. Further, the processor creates a metric space by analyzing the identified features of the activation function in the benchmark datasets. The metric space is a low-dimensional representation of the activation functions, is representative of informative features associated with the activation functions and has a predefined distance metric. Furthermore, the processor optimizes the activation functions based on the metric space by employing dimensionality reduction techniques to visualize the metric space, wherein clusters of high performing activation functions are segregated from poorly performing activation functions. Yet further, the processor determines characteristics of the optimized activation functions which are predictive of performance of feature sets of the optimized activation function in each of the activation function dataset. Finally, the processor selects activation functions from the optimized activation functions based on the determination. The selected activation functions are applied to improve real-world tasks carried out by neural networks.

BRIEF DESCRIPTION OF THE ACCOMPANYING DRAWINGS

The present invention is described by way of embodiments illustrated in the accompanying drawings wherein.

Figure 9:
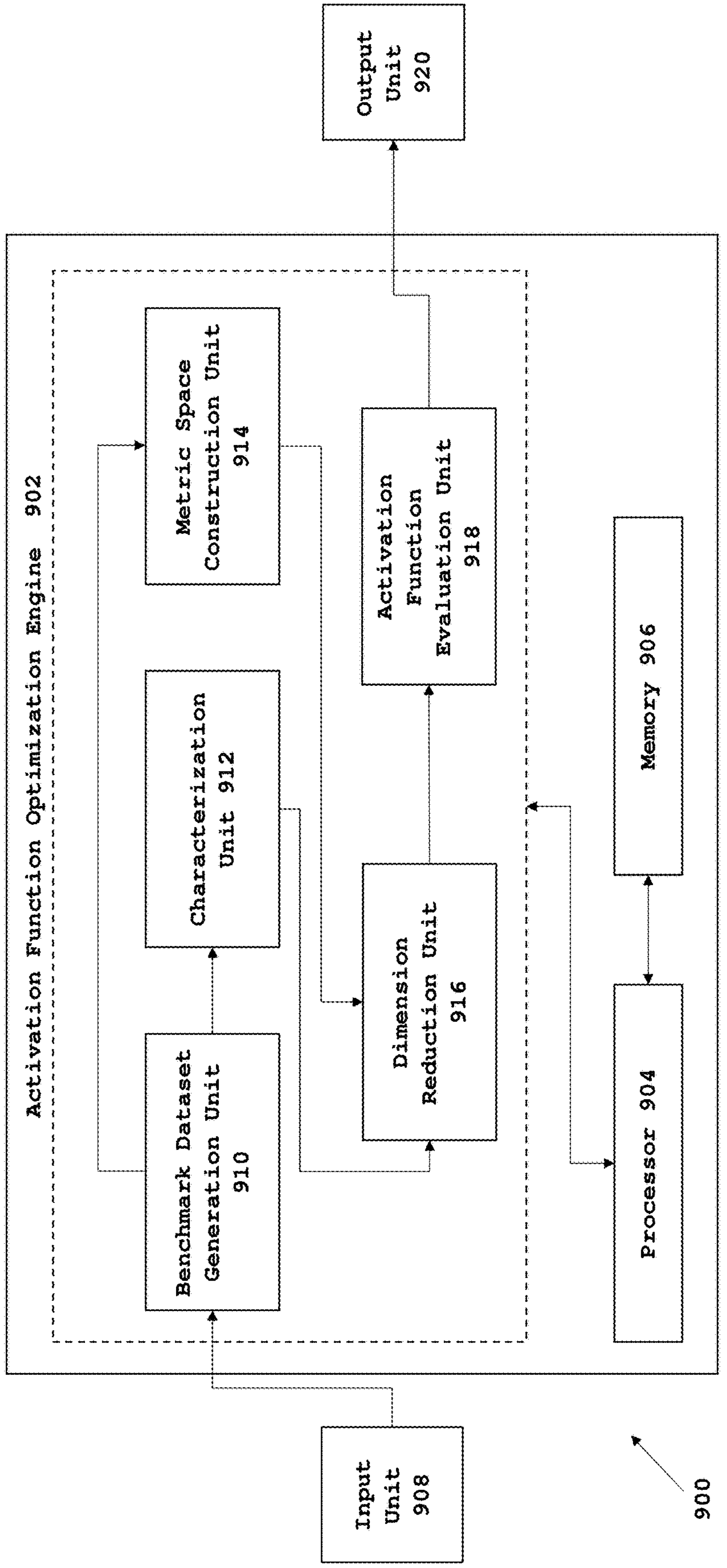
Figure 10:
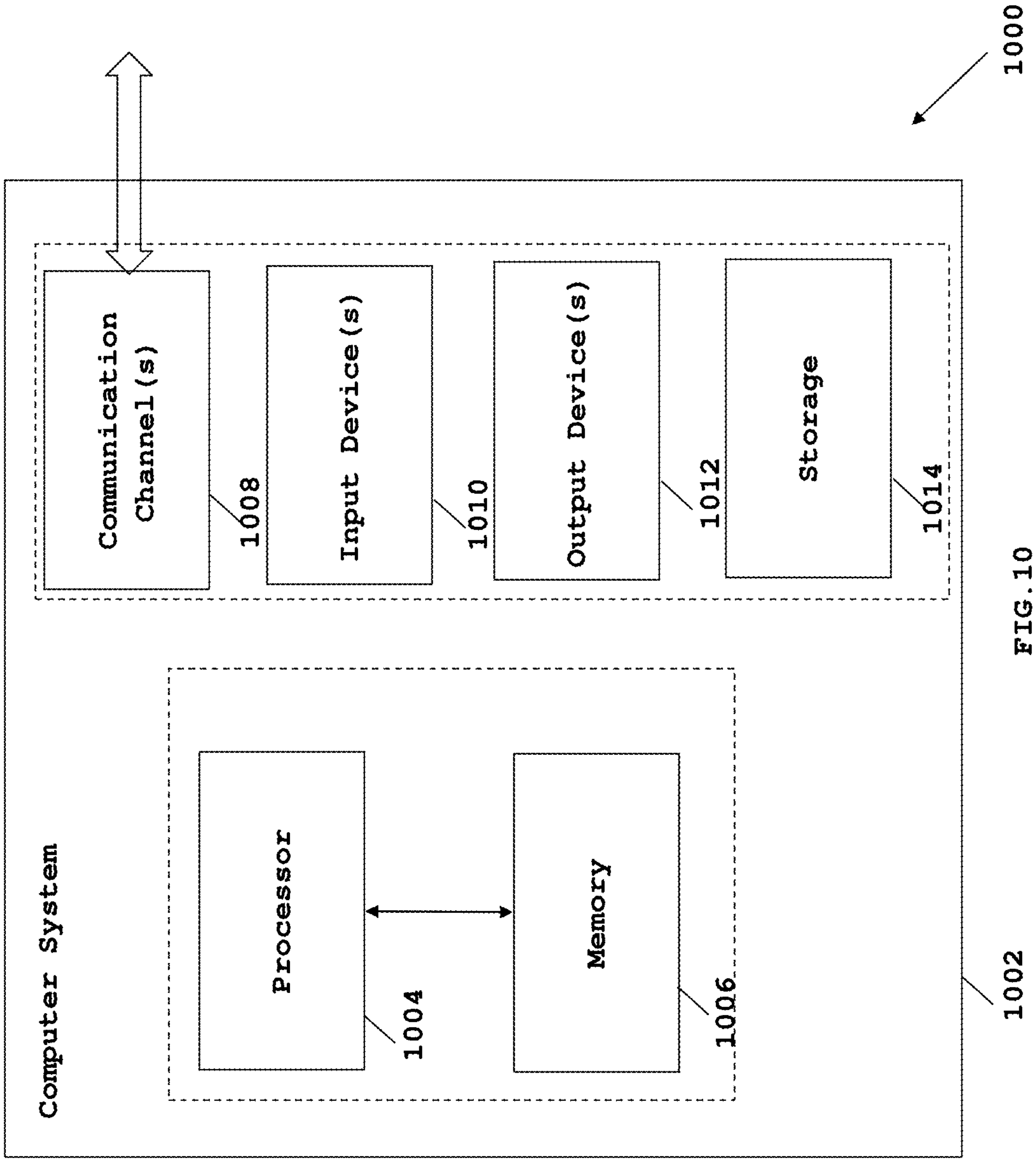

FIGS. 8*a*-8*b* illustrate sample activation functions optimized, in accordance with an embodiment of the present invention;

FIG. 9 is a detailed block diagram of a system for optimizing activation functions in a neural network, in accordance with an embodiment of the present invention; and FIG. 10 illustrates a block diagram of an exemplary computer system in which various embodiments of the present invention may be implemented.

DETAILED DESCRIPTION OF THE INVENTION

The present invention discloses a system and a method which provides for optimization of activation functions to improve efficiency of neural networks. The present invention optimizes activation functions by combining data-driven insights with precomputed results and streamlines activation function optimization through systematic benchmark dataset generation, feature extraction, metric space construction, and selection of suitable functions, thereby providing a comprehensive approach to enhance neural network performance.

In various embodiments of the present invention, an existing machine learning system that is used on some real-world tasks is employed and a search algorithm is applied to optimize a better activation function that improves performance on the task. The optimized activation function then replaces the old activation function, and the result is a machine learning system with improved accuracy on the task.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
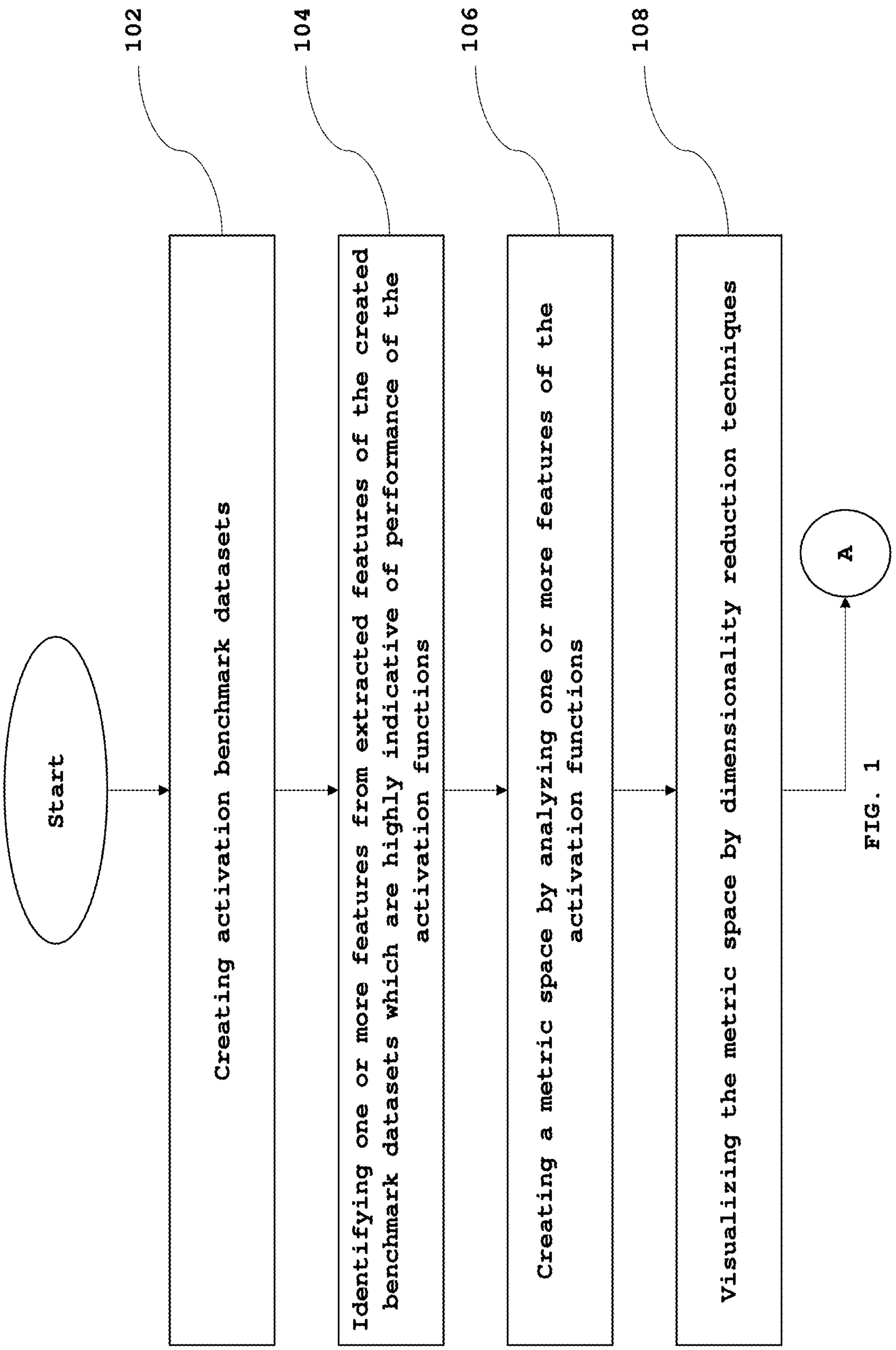
FIG. 1 illustrates a flowchart of a method for optimizing activation functions in a neural network, in accordance with an embodiment of the present invention.

FIGS. 1 and 1A illustrate a flowchart depicting a method for carrying out optimization of activation functions to improve efficiency of neural network architectures, in accordance with various embodiments of the present invention.

At step 102, activation benchmark datasets are created. In an embodiment of the present invention, the activation benchmark datasets are created by training one or more neural network architectures with a plurality of systematically generated activation functions. The activation benchmark datasets facilitate analysis of activation function properties at a large scale in order to determine the better performing activation functions. In an exemplary embodiment of the present invention, the activation benchmark datasets are created by training convolutional, residual and vision transformer architectures with a plurality of activation functions for various tasks. In an example, the activation benchmark dataset Act-Bench-CNN contains training results for a plurality of activation functions when paired with convolutional neural network for tasks associated with image dataset such as CIFAR-10. In another example, the activation benchmark dataset Act-Bench-ResNet contains training results for a plurality of activation functions when paired with residual neural network for tasks associated with CIFAR-10. In yet another example, the activation benchmark dataset Act-Bench-ViT contains training results for a plurality of activation functions when paired with MobileViTv2-0.5 neural network for tasks associated with Imagenette. The training results indicate the performance of the activation functions on specific tasks carried out by the neural networks mentioned above.

Figure 2:
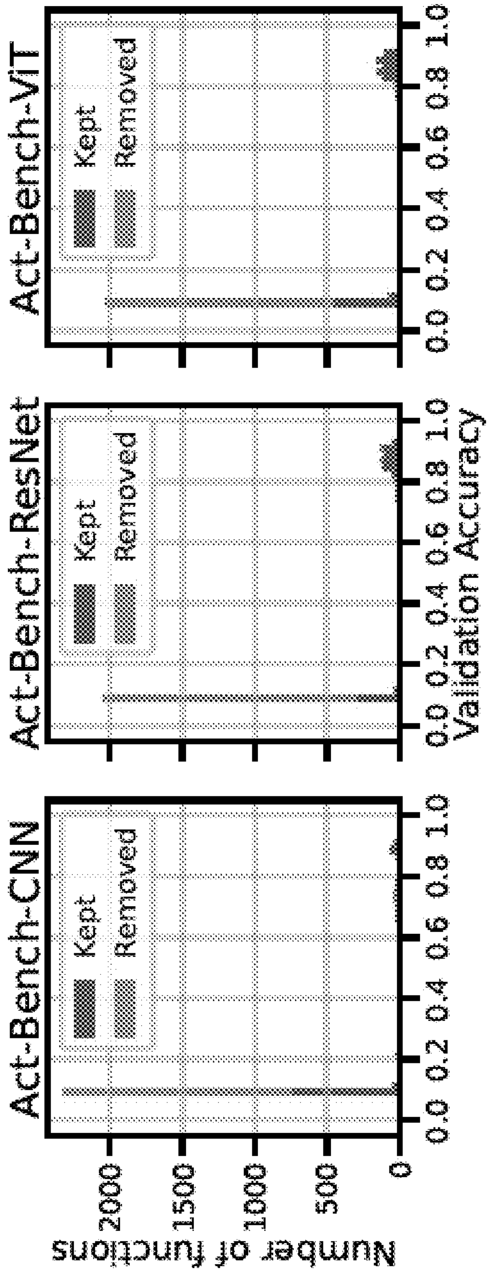
FIG. 2 illustrates histogram representation of distribution of validation accuracies with activation functions from the three benchmark datasets, in accordance with an embodiment of the present invention.
Figure 3:
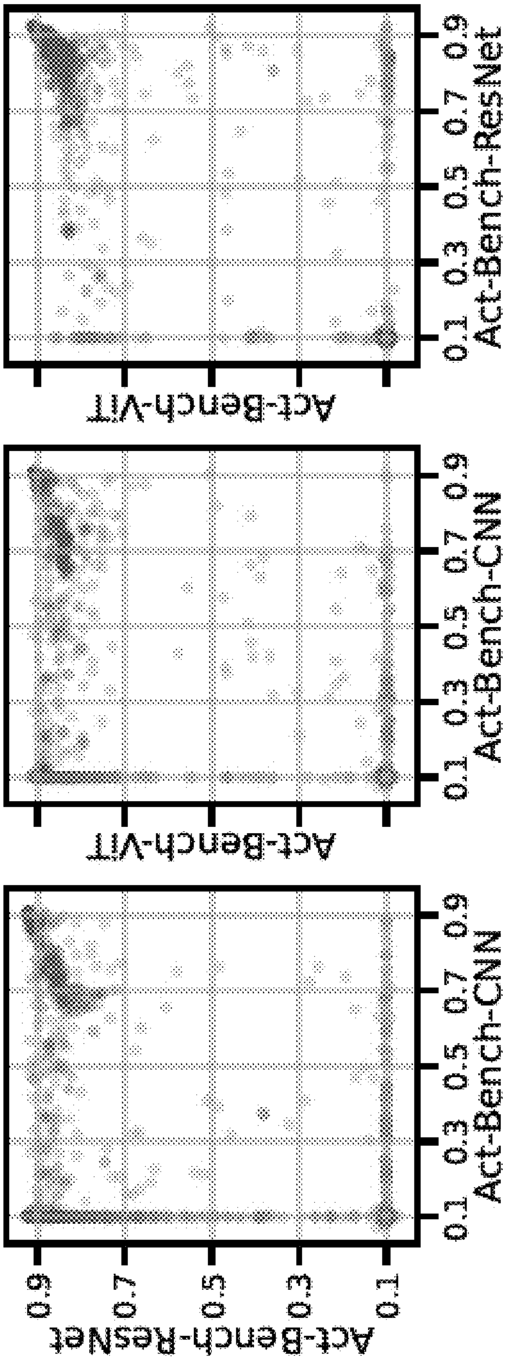
FIG. 3 illustrates scatter plot representation of distribution of validation accuracies across the benchmark datasets, in accordance with an embodiment of the present invention.

For example, FIG. 2 shows the distribution of validation accuracies for different activation functions across the three created benchmark datasets, which are indicative of the performance of the activation functions on specific tasks carried out by the neural networks. The histograms show that most activation functions performed poorly suggesting that it is difficult to design good activation functions and explains why existing methods for searching for good activation functions are often so computationally inefficient, inaccurate, and expensive. FIG. 2 shows that there are some activation functions that achieve good performance. Scatter plots in FIG. 3 show the same distribution of accuracies as shown in FIG. 2, illustrating how activation functions perform across different tasks. As shown in FIG. 3, all three plots contain clusters of points in the upper right corner that are linearly correlated. The clusters of points in the upper left and lower right corners of FIG. 3 represent activation functions that succeed in one task but fail in another. FIG. 3 shows that there are modifications to activation functions that can make them more powerful, even for new tasks. In order to optimize activation functions in an efficient and cost-effective manner for improving performance of neural networks the following steps are carried out, in accordance with an embodiment of the present invention.

At step 104, features of activation functions which are highly indicative of performance of the activation functions are identified. In an embodiment of the present invention, various features hypothesized to be predictive of performance of the activation functions in the created benchmark datasets are evaluated by Uniform Manifold Approximation and Projection (UMAP) technique. From the various features hypothesized to be predictive of performance, the features which are highly indicative of activation function's performance are identified. In an exemplary embodiment of the present invention, two activation function features are identified which are highly indicative of activation function's performance i.e., the spectrum of the Fisher information matrix (FIM) associated with the model's predictive distribution at initialization, and (2) the activation function's output distribution. FIM helps in understanding how a neural network works and helps in understanding how well the network can learn and make predictions, and how stable a neural network can be. Different activation functions can lead to different FIM eigenvalues for the same network. Further, the activation function's output distribution is indicative of shape of an activation function. The shape defines how the activation function reacts to different input values. It can be either linear or nonlinear, and this impacts the neural network's ability to handle complex patterns and make predictions.

At step 106, a metric space is created by analyzing the identified features of the activation functions. In an embodiment of the present invention, FIM eigenvalues are calculated which are used to filter out the poorly performing activation functions. Distance metric between different FIM eigenvalues measures how similar two activation functions are based on their FIM eigenvalues. With this distance metric, the FIM eigenvalues can be used to create a metric space for activation functions. However, FIM eigenvalues incorporate multiple sources of information which incorporate noise in the FIM eigenvalues. Advantageously, the present invention combines the FIM eigenvalues with activation function outputs distribution to overcome the limitation with FIM eigenvalues. The combination of features can accurately predict the performance of activation functions.

In an embodiment of the present invention, to understand the shape of activation functions, the function's outputs are sampled across a range of input values. Proper network initialization ensures that input values follow a standard normal distribution (mean=0, standard deviation=1). Consequently, a vector of expected activation function outputs is obtained by randomly sampling inputs. Euclidean distance between two activation functions is then used to measure the dissimilarity of their shapes to obtain activation function output values. This provides a reliable and cost-effective means of comparing activation functions. The activation function output values along with the FIM eigenvalues form a metric space, which serves as a potent surrogate search space, enabling efficient identification of optimal activation functions.

Figure 4:
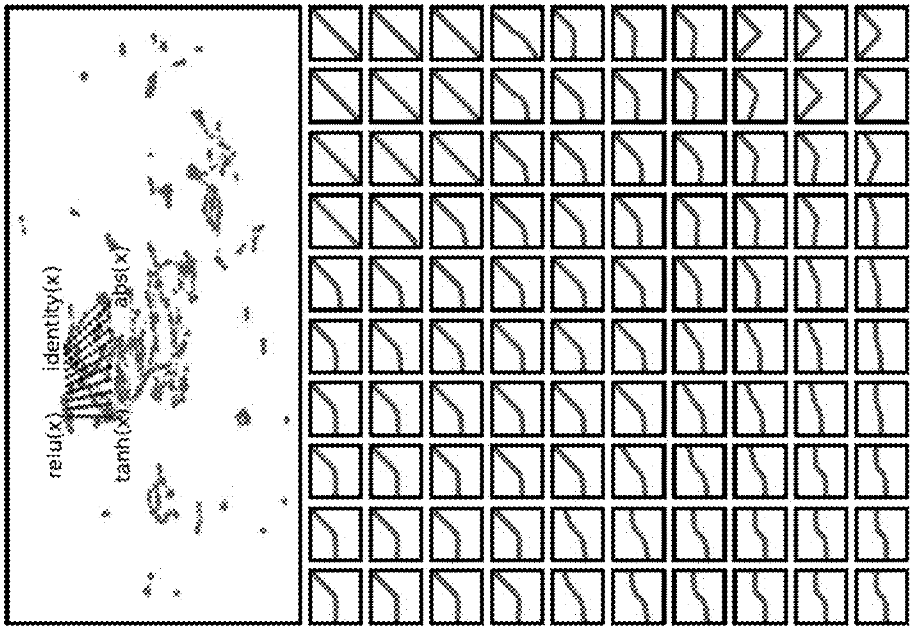
FIG. 4 illustrates a representation of Uniform Manifold Approximation and Projection (UMAP) embedding of the activation functions in the search space utilized by the three benchmark datasets, in accordance with an embodiment of the present invention.

In order to effectively optimize activation functions, the metric space (surrogate space) needs to be low-dimensional, represent informative features associated with the activation function, and have a predefined distance metric. At step 108, a dimensionality reduction technique is employed to visualize the metric space. In an exemplary embodiment of the present invention, Uniform Manifold Approximation and Projection (UMAP) dimensionality reduction technique is employed to visualize the features i.e., FIM and activation function output distribution of the benchmark datasets. This visualization leads to a combined metric space that is used to optimize activation functions for improving neural networks. UMAP helps in analyzing the patterns and groupings of activation functions that perform similarly. UMAP creates a metric space to show how different activation functions are related to each other. FIG. 4 illustrates a 2D representation, portraying 2,913 activation functions derived from the benchmark datasets, in an embodiment of the present invention. Each function is represented as an 80-dimensional vector representing its output values. The interpolation between these embedded points affirms the effectiveness of UMAP in capturing the inherent structure.

Figure 5:
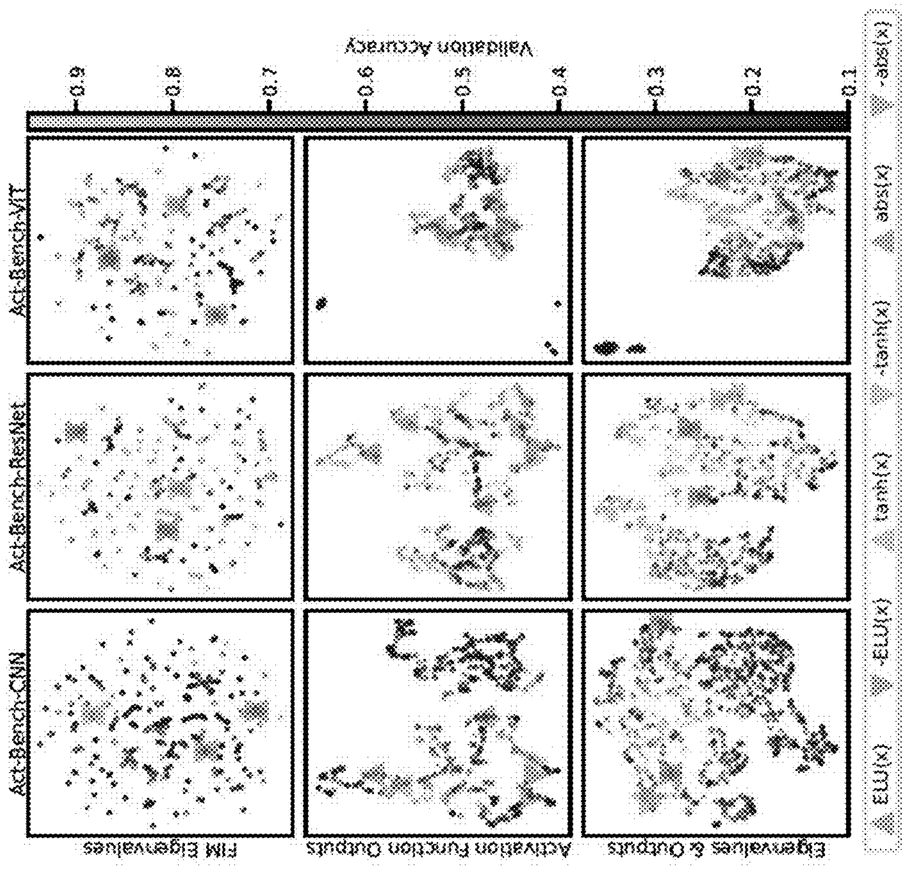
FIG. 5 illustrates a representation of UMAP embedding of the activation functions for each dataset (column) and feature type (row), in accordance with an embodiment of the present invention.

FIG. 5 illustrates UMAP embeddings of activation function, in accordance with an embodiment of the present invention. As shown in FIG. 5, each column corresponds to a different benchmark dataset (Act-Bench-CNN, Act-Bench-ResNet, or Act-Bench-ViT), and each row represents a different distance metric. Each data point signifies a unique activation function, and the points are color-coded in accordance with their performance in the benchmark task. The color-coded points are indicative of accuracy of each point. Points with similar colors are grouped together which demonstrate that the embedding obtained is accurate. In an embodiment of the present invention, the UMAP embeddings of FIG. 5 were generated in an unsupervised manner. FIG. 5 illustrates efficiency of different features in predicting activation function performance in each dataset. The top row displays 2D UMAP plots of FIM eigenvalue vectors with clusters of points with similar colors. The clusters in the top row represent activation functions with similar FIM eigenvalues, which tend to lead to comparable neural network training outcomes. Also, FIG. 5 shows certain clusters with a wide range of performances, indicating diversity in activation function behaviors. FIG. 5 further represents determination of number of features associated with the activation functions to be combined for yielding better results.

Middle row of FIG. 5 presents 2D UMAP plots of output vectors for each activation function. FIG. 5 shows that poorly performing activation functions are better separated from the rest. Neighboring points typically have similar colors, indicating that activation functions with similar shapes tend to perform similarly. The plots show smooth transitions in accuracy along one-dimensional manifolds, demonstrating that UMAP organizes activation functions in a meaningful way. UMAP plots of output vectors for each activation function as shown in FIG. 5 offer more information about activation functions than those based on FIM eigenvalues.

In the bottom row of FIG. 5, both FIM eigenvalues and activation function outputs are combined. As a result, activation functions that are similar in shape, have similar FIM eigenvalues, or both, are put close to each other on this map. The bottom row of FIG. 5 is a combined metric space which clusters high-performing activation functions in one place. This enables elimination of poor activation functions to the edges and places the good ones in the center.

At step 110, the visualizations are further analyzed to determine activation functions characteristics which are predictive of performance in each dataset. In an embodiment of the present invention, activation functions with similar shapes are determined that lead to similar performances, and those with different shapes often produce different results. As shown in FIG. 5, the UMAP coordinates in the lower row aid in determining essential information required to forecast the performance of activation functions accurately. Intricacies of multi-dimensional feature vectors associated with the optimized activation functions are distilled into a streamlined 2D representation, which can be efficiently computed to determine characteristics of the optimized activation functions which serve as a guide for optimizing activation functions.

At step 112, activation functions based on analysis of visualization by UMAP techniques are selected. Traditionally, selection of activation functions involves training a neural network to assess the performance of each potential activation function. However, in an embodiment of the present invention, a significant advantage is realized by employing pre-computed results from the metric space associated with the benchmark datasets. This advantageous approach enables experimentation with diverse search algorithms and the execution of repeated trials, thereby facilitating a comprehensive comprehension of the results' significance.

Conventional activation function search processes typically necessitate complete training of a neural network for the comprehensive evaluation of each candidate function, a procedure often characterized by significant computational expenses. However, employing benchmark datasets in the present embodiment offers a distinct advantage. As these datasets already contain pre-computed results, they afford the opportunity to explore diverse search algorithms and conduct multiple iterations for the purpose of establishing statistical significance of the outcomes.

In an example embodiment of the present invention, for searching and selection of activation functions search algorithms were evaluated on the three created benchmark datasets. Firstly, a random search was included as a baseline reference without employing the FIM eigenvalues and activation function outputs. Then, three algorithms viz. specifically weighted k-nearest regression with k=3 (KNR), Random Forest Regression (RFR), and Support Vector Regression (SVR), were subjected to evaluation. These algorithms were employed in their default configurations as provided by the scikit-learn package, without hyperparameter tuning. Each algorithm was supplied with distinct activation function features, aimed at assessing their potential to forecast performance. The search algorithms initiate their evaluation process by assessing eight activation functions including the activation function Rectified Linear Unit relu(x) and seven other activation functions viz. exponential linear unit elu(x), scaled exponential linear unit selu(x), sigmoid(x), softplus(x), softsign(x), swish(x) and tanh(x) are selected to form a starting point for the metric space. Typically, using existing methods, such evaluations involve the arduous task of training from the ground up, however, the created benchmark datasets of the present invention, streamlined the process by allowing retrieval of pre-computed results from the metric space. Subsequently, the algorithms utilized the validation accuracy of the eight activation functions to forecast the performance of all unexamined functions within the dataset. The activation function projected to have the highest predicted accuracy was then subjected to evaluation. The performance of this assessed activation function was subsequently incorporated into the roster of established results. This iterative procedure continued until 100 distinct activation functions had been evaluated. In an embodiment of the present invention, each experiment, involving a distinct search algorithm, activation function feature set, and benchmark dataset, was iterated 100 times for comprehensive evaluation.

Figure 6:
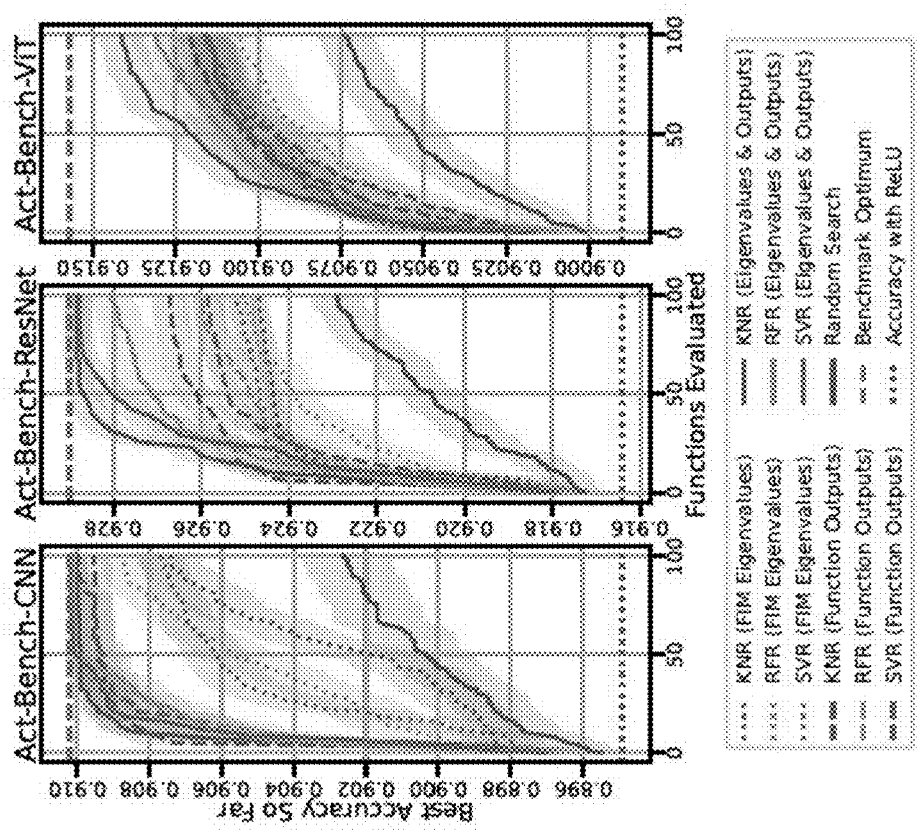
FIG. 6 illustrates search results on three benchmark datasets with different search algorithm employing different UMAP features, in accordance with an embodiment of the present invention.

FIG. 6 illustrates the outcomes of search on three benchmark datasets. The curves do not represent a single search trial but rather reflect average performance derived from 100 independent iterations, a capacity facilitated by the benchmark datasets. The results, indicated by the shaded confidence intervals, are deemed reliable and are not merely the outcome of random chance. From FIG. 6 it is evident that all search algorithms, including random search, consistently identify activation functions that surpass the performance of the Rectified Linear Unit (ReLU). While ReLU is a commendable activation function delivering strong results across various tasks, superior performance is achievable with innovative activation functions. Consequently, the continued use of ReLU in future applications is unlikely to yield optimal outcomes.

Also, as shown in FIG. 6, each curve corresponds to a distinct search algorithm, namely K-nearest regression (KNR), Random Forest Regression (RFR), or Support Vector Regression (SVR), employing various UMAP features, including FIM eigenvalues, activation function outputs, or both (as visualized in FIG. 5). These curves represent the mean validation accuracy of the best-optimized activation function, aggregated from 100 independent trials, with shaded areas depicting 95% confidence interval. Consistently, regression using UMAP features outperforms random search, and searching with a combination of eigenvalues and outputs surpasses searching with either feature in isolation. Among the three regression algorithms, KNR stands out as the most efficient, rapidly surpassing the performance of ReLU and efficiently uncovering nearly optimal activation functions across all benchmark tasks. This underscores that the identified features viz. FIM and activation function outputs facilitate effective optimization of activation functions, even with readily available search methods, and the benchmark datasets substantiate these findings with statistical validity.

FIG. 6 also indicates that all regression algorithms outperform random search. The results illustrate that all regression algorithms consistently outperform random search, irrespective of the activation function features or benchmark dataset considered, emphasizing the significance of both FIM eigenvalues and activation function outputs in predicting activation function performance. Furthermore, it is evident that regression algorithms trained on a combination of FIM eigenvalues and activation function outputs consistently outperform those trained solely on either eigenvalues or outputs. FIG. 6 further reinforces the findings of FIG. 5, where FIM eigenvalues facilitate the matching of similar activation functions in terms of training dynamics, activation function outputs enable a practical low-dimensional representation for efficient search, and the combination of both features results in a more tractable and optimized problem.

In an embodiment of the present invention, the selected activation functions are applied to new datasets and search spaces to exhibit its functions. The experiments were expanded in two significant dimensions. Firstly, while the neural network architectures remained consistent, the experiments involved larger and more challenging datasets, namely, All-CNN-C on CIFAR-100, ResNet-56 on CIFAR-100, and MobileViTv2-0.5 on ImageNet. Secondly, a considerably larger activation function search space was explored, comprising 425,896 distinct activation functions, rooted in four-node computation graphs. This extensive and diverse space, unlike the precomputed benchmark datasets, was not predetermined, thereby subjecting the findings of the benchmark experiments to validation in a real-world production environment. Building upon the benchmark results, the K-nearest regression (KNR) with k=3 was employed as the chosen search algorithm. The search initiatives commenced by evaluating eight established activation functions, including ELU, ReLU, SELU, sigmoid, Softplus, Softsign, Swish, and tanh. Subsequently, eight parallel workers executed the evaluation of activation functions anticipated to exhibit superior performance based on predictions.

Figure 7:
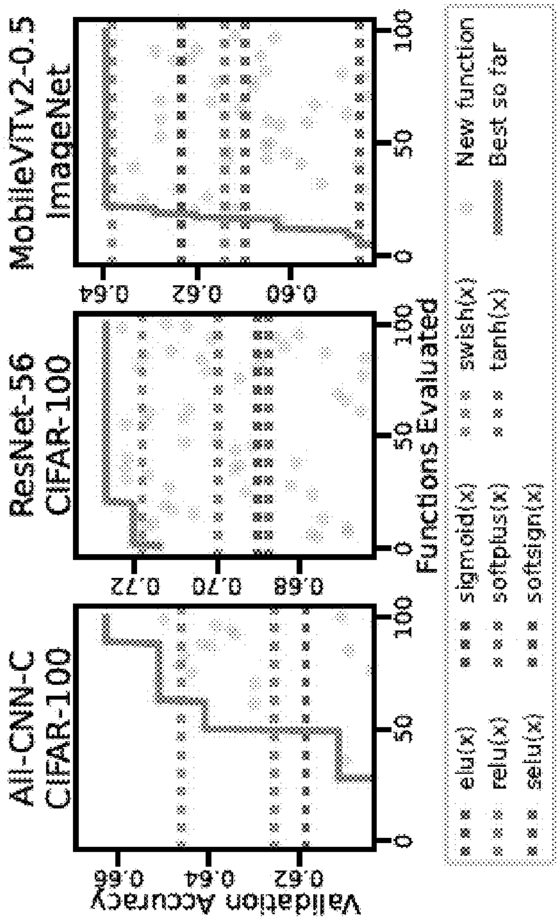
FIG. 7 illustrate a progress of activation function search, where each point represents validation accuracy with a unique activation function and a solid line representing performance of best activation function found, in accordance with an embodiment of the present invention.

FIG. 7 illustrates progressive enhancement of activation functions attained through all three search methodologies, in accordance with various embodiments of the present invention. Each data point corresponds to the validation accuracy associated with a distinct activation function, while the solid line represents the performance of the best-optimized activation function up to that point. It was observed that the present invention consistently identifies novel activation functions that surpass the performance of all baseline functions across all scenarios. This outcome underscores the significance of optimal activation functions and the substantial impact of their task-specific optimization. This approach enables the efficient specification of function families in a concise manner, allowing focused exploration of regions where promising functions are likely to be found, while maintaining a comprehensive search process.

Advantageously, each experiment consistently led to the optimization of new activation functions that surpassed the performance of established baseline functions. Remarkably, the searches demonstrated high efficiency by necessitating only a limited number of evaluations to achieve performance improvements. Impressively, in the context of the search involving ResNet-56 on CIFAR-100, an activation function outperforming all baselines was identified within only the second evaluation. Tables 1 to 3 display accuracy results with various activation functions, in accordance with an embodiment of the present invention. In CIFAR-100 experiments, the results represent the median test accuracy from three runs, whereas in ImageNet experiments, the results reflect the validation accuracy from a single run.

TABLE 1

| All-CNN-C on CIFAR-100 | |
|---|---|
| Activation Functions | Accuracy |
| HardSigmoid (HardSigmoid (x)) · ELU (x) | 0.6990 |
| σ (Softsign (x)) · ELU (x) | 0.6950 |
| Swish (x)/SELU (1) | 0.6931 |
| ELU | 0.6312 |
| ReLU | 0.6897 |
| SELU | 0.0100 |
| Sigmoid | 0.0100 |
| Softplus | 0.6563 |
| Softsign | 0.2570 |
| Swish | 0.6913 |
| Tanh | 0.3757 |

TABLE 2

| ResNet-56 on CIFAR-100 | |
|---|---|
| Activation Functions | Accuracy |
| Swish (−2x) | 0.7469 |
| SELU (sinh(e arctan(x) − 1)) | 0.7458 |
| x · erfc (ELU (x)) | 0.7419 |
| ELU | 0.7411 |
| ReLU | 0.7348 |
| SELU | 0.6967 |
| Sigmoid | 0.5766 |
| Softplus | 0.7397 |
| Softsign | 0.6624 |
| Swish | 0.7401 |
| Tanh | 0.6754 |

TABLE 3

| MobileViTv2-0.5 on ImageNet | |
|---|---|
| Activation Functions | Accuracy |
| −x · σ(x) · HardSigmoid (x) | 0.6396 |
| ELU ( Swish (−x)) | 0.6394 |
| Swish(x) · erfc (bessel i0e(x)) | 0.6336 |
| ELU | 0.6233 |
| ReLU | 0.6139 |
| SELU | 0.6096 |
| Sigmoid | 0.5032 |
| Softplus | 0.5853 |
| Softsign | 0.5710 |
| Swish | 0.6383 |
| Tanh | 0.6098 |

Figure 8:
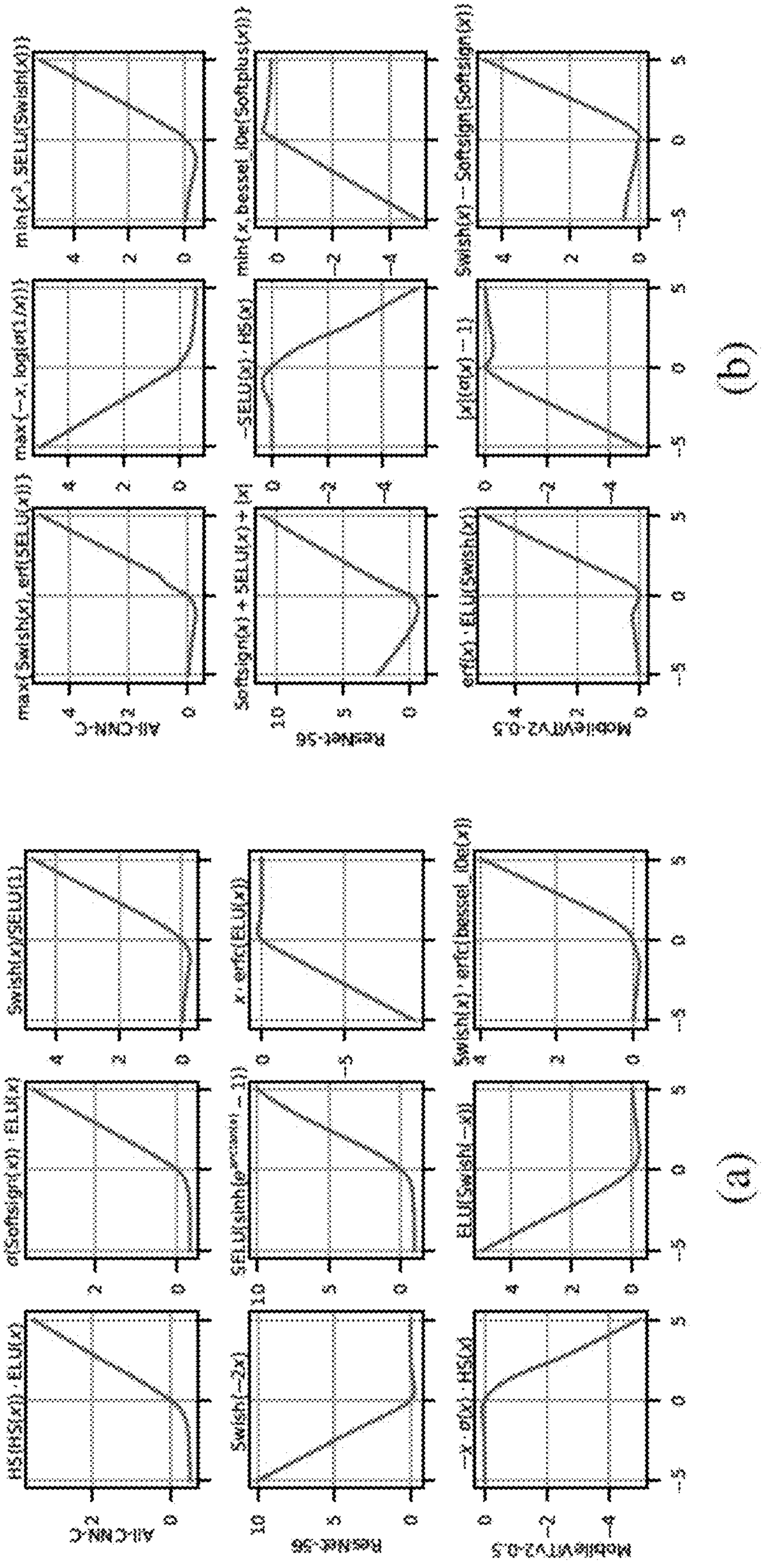

FIG. 8 provides a representation of the distinct activation functions unearthed during the search endeavors, in accordance with an embodiment of the present invention. The optimal functions, as depicted in FIG. 8 (8*a*), exhibit similarities to established functions such as ELU and Swish, with subtle variations in attributes like saturation level, the inclination of the positive segment, and the dimensions and intensity of the negative feature. This outcome aligns with expectations, considering these functions served as the initial reference points for the search. The method of present invention yielded numerous intriguing activation functions (depicted in FIG. 8 (8*b*), as they consistently outperformed ReLU. These functions possess characteristics uncommon among conventional deep learning activation functions, featuring properties like discontinuous derivatives at x=0 and the absence of saturation, diverging as $x \rightarrow \pm\infty$. In contrast to Swish, which exhibits a negative bump, many of these functions incorporate positive bumps. The present invention leads to superior activation functions tailored for specific novel tasks. Collectively, FIG. 8 emphasizes the capacity of the method of present invention for both optimizing existing functions (exploitation) and discovering novel ones (exploration).

FIG. 9 is a detailed block diagram of a system 900 for carrying out optimization of activation functions for improving neural networks, in accordance with various embodiments of the present invention. Referring to FIG. 1, in an embodiment of the present invention, the system 900 comprises an activation function optimization engine 902, an input unit 908 and an output unit 920. The input unit 908 and output unit 920 are connected to the engine 902 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, a Local Area Network (LAN), a Metropolitan Area Network (MAN) and a Wide Area Network (WAN).

In an embodiment of the present invention, the engine 902 comprises a processor 904 and a memory 906. In various embodiments of the present invention, the engine 902 is configured to optimize activation functions for improving neural networks. The various units of the engine 902 are operated via the processor 904 specifically programmed to execute instructions stored in the memory 906 for executing respective functionalities of the units of the engine 902 in accordance with various embodiments of the present invention.

In an embodiment of the present invention, the engine 902 comprises a benchmark dataset generation unit 910, a characterization unit 912, a metric space construction unit 914, a dimension reduction unit 916 and an activation function evaluation unit 918.

In an embodiment of the present invention, the benchmark dataset generation unit 910 is configured to receive inputs from the input unit 908 for generating activation benchmark datasets. In an exemplary embodiment of the present invention, the inputs are associated with the neural network and the datasets for which the activation functions are to be optimized and the search space that are to be explored for the activation functions. In an embodiment of the present invention, the benchmark dataset generation unit 910 creates activation benchmark datasets by training one or more neural network architectures with a plurality of systematically generated activation functions. The activation benchmark datasets facilitate analysis of activation function properties at a large scale in order to determine the better performing activation functions. In an embodiment of the present invention, the activation benchmark datasets are created by training convolutional, residual and vision transformer neural network architectures with a plurality of activation functions for various tasks. In an exemplary embodiment of the present invention, the activation benchmark dataset Act-Bench-CNN contains training results for a plurality of activation functions when paired with convolutional neural network for task associated with image datasets such as CIFAR-10. In another exemplary embodiment of the present invention, the activation benchmark dataset Act-Bench-ResNet contains training results for a plurality of activation functions when paired with residual neural network for tasks associated with CIFAR-10. In yet another exemplary embodiment of the present invention, the activation benchmark dataset Act-Bench-ViT contains training results for a plurality of activation functions when paired with MobileViTv2-0.5 neural network for tasks associated with Imagenette. The training results indicate the performance of the activation functions on specific tasks carried out by the neural networks mentioned above.

In an embodiment of the present invention, the characterization unit 912 is configured to extract features from the created benchmark datasets and perform characterization of the extracted features to identify features from the extracted features of the activation functions in the benchmark datasets that are highly indicative of activation function's performance. In an exemplary embodiment of the present invention, two activation function features are identified which are highly indicative of activation function's performance i.e., (1) the spectrum of the FIM associated with the model's predictive distribution at initialization, and (2) the activation function's output distribution. Both the features contribute unique information of an activation function. FIM helps in understanding how a neural network works and helps in understanding how well the network can learn and make predictions, and how stable a neural network can be. Different activation functions can lead to different FIM eigenvalues for the same network. Further, the activation function's output distribution is indicative of the shape of an activation function. The shape defines how the activation function reacts to different input values. It can be either linear or nonlinear, and this impacts the neural network's ability to handle complex patterns and make predictions.

In an embodiment of the present invention, the metric space construction unit 914 is configured to create a metric space by analyzing the identified features of the activation functions. The metric space construction unit 914 combines the FIM and activation function output distribution features of activation functions to create a metric space having a low-dimensional representation of the activation functions. In an embodiment of the present invention, metric space construction unit 914 creates the metric space for computing distances between activation functions. The low-dimensional representation of the FIM matrix and activation function's output distribution renders the metric space a practical surrogate, to optimize activation functions.

In order to effectively optimize activation functions, the surrogate space needs to be low-dimensional, represent informative features, and have a predefined distance metric. In an embodiment of the present invention, the dimension reduction unit 916 is configured to visualize the metric space by employing a dimensionality reduction technique. In an embodiment of the present invention, the dimension reduction unit 916 employs UMAP dimensionality reduction technique to visualize the features i.e., FIM and activation function output distribution of the created benchmark datasets. This visualization leads to a combined surrogate space that is used to optimize activation functions for improving neural networks. UMAP helps in analyzing the patterns and groupings of activation functions that perform similarly.

In an embodiment of the present invention, the activation function evaluation unit 918 is configured to determine activation function characteristics which are predictive of performance in each dataset. In an embodiment of the present invention, the activation function evaluation unit 918 determines the activation function characteristics after analysis of the visualization. Activation functions with similar shapes lead to similar performances, and those with different shapes often produce different results. The activation function evaluation unit 918 subsequently selects activation functions based on analysis of visualization. Typically, selection of activation functions comprise searching for activation functions by training a neural network from scratch in order to evaluate each candidate activation function. In an embodiment of present invention, advantageously, with the benchmark datasets, all of the results are already pre-computed in the metric space. This information makes it possible to experiment with different search algorithms and conduct repeated trials to understand the significance of the results.

In various embodiments, the present invention can be applied to any real-world task where image recognition systems are used such as: (1) medical imaging including, but not limited, diagnosing diseases and interpreting x-rays, MRIs, and CT scans, (2) autonomous vehicles, especially identifying pedestrians, other vehicles, and road signs, (3) retail, where products need to be identified to manage inventory, (4) agriculture, in order to identify crop growth, diseases, and optimal harvest time, (5) face recognition, for example in airports and in mobile phones.

FIG. 10 illustrates an exemplary computer system in which various embodiments of the present invention may be implemented. The computer system 1002 comprises a processor 1004 and a memory 1006. The processor 1004 executes program instructions and is a real processor. The computer system 1002 is not intended to suggest any limitation as to scope of use or functionality of described embodiments. For example, the computer system 1002 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1006 may store software for implementing various embodiments of the present invention. The computer system 1002 may have additional components. For example, the computer system 1002 includes one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various software executing in the computer system 1002 and manages different functionalities of the components of the computer system 1002.

The communication channel(s) 1008 allows communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but not limited to, a keyboard, mouse, pen, joystick, trackball, a voice device, a scanning device, touch screen or any another device that is capable of providing input to the computer system 1002. In an embodiment of the present invention, the input device(s) 1010 may be a sound card or similar device that accepts audio input in analog or digital form. The output device(s) 1012 may include, but not limited to, a user interface on CRT or LCD, printer, speaker, CD/DVD writer, or any other device that provides output from the computer system 1002.

The storage 1014 may include, but not limited to, magnetic disks, magnetic tapes, CD-ROMs, CD-RWs, DVDs, flash drives or any other medium which can be used to store information and can be accessed by the computer system 1002. In various embodiments of the present invention, the storage 1014 contains program instructions for implementing the described embodiments.

The present invention may suitably be embodied as a computer program product for use with the computer system 1002. The method described herein is typically implemented as a computer program product, comprising a set of program instructions which is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A method for optimizing activation functions in neural networks, the method is implemented by a processor executing instructions stored in the memory, the method comprises:

creating activation function benchmark datasets by training one or more neural network architectures with a plurality of activation functions;

identifying one or more features indicative of performance of the activation functions in the activation benchmark datasets;

creating a metric space by analyzing the identified features of the activation functions, wherein the metric space is a low-dimensional representation of the activation functions, is representative of informative features associated with the activation functions and have a predefined distance metric;

optimizing the activation functions based on the metric space by employing dimensionality reduction techniques to visualize the metric space, wherein clusters of high performing activation functions are segregated from poorly performing activation functions;

determining characteristics of the optimized activation functions which are predictive of performance of feature sets of the optimized activation function in each of the activation function dataset; and selecting activation functions from the optimized activation functions based on the determination, wherein the selected activation functions are applied to improve real-world tasks carried out by neural networks.

2. The method as claimed in claim 1, wherein the activation function benchmark datasets comprise results obtained through the training of the neural network architectures for various tasks and are indicative of performance of the activation functions on specific tasks carried out by the neural network architectures, the neural network architectures comprise convolutional, residual, and vision transformer architectures, and wherein the activation function datasets facilitate analysis of activation function properties.

3. The method as claimed in claim 1, wherein the dimensionality reduction technique employs Uniform Manifold Approximation and Projection (UMAP) to create visual representation of the metric space.

4. The method as claimed in claim 1, wherein the identified features of the activation functions comprise fisher information matrix and activation function outputs, and wherein the fisher information matrix and activation function outputs are combined to create the metric space, the fisher information matrix aids in understanding working, ability to learn and predict, stability of neural networks and the activation function outputs represent the output distribution of the activation function benchmark datasets which is indicative of shape of an activation function which defines how the activation function reacts to different input values that impacts the neural network's ability to handle complex patterns and make predictions.

5. The method of as claimed in 1, wherein the step of creating the metric space comprises computing distances between the plurality of activation functions.

6. The method as claimed in claim 1, the step of creating activation function benchmark datasets comprises creating an activation benchmark dataset 'Act-Bench-CNN' which comprises training results for a plurality of activation functions when paired with convolutional neural network for tasks associated with image dataset including CIFAR-10, creating an activation benchmark dataset 'Act-Bench-ResNet' which comprises training results for a plurality of activation functions when paired with residual neural network for tasks associated with CIFAR-10, and creating activation benchmark dataset 'Act-Bench-ViT' which comprises training results for a plurality of activation functions when paired with MobileViTv2-0.5 neural network for tasks associated with Imagenette.

7. The method as claimed in claim 1, wherein the step of identifying the one or more features comprises evaluating features hypothesized to be indicative of performance of the activation functions in the created activation function datasets by employing UMAP technique to identify the one or more features which are highly indicative of performance of the activation functions.

8. The method as claimed in claim 1, wherein the step of creating the matrix space comprises:
- calculating fisher information matrix eigenvalues which are used to filter out the poorly performing activation functions, the calculation is carried out by computing a distance metric between different fisher information matrix eigenvalues which measures similarity between two activation functions of the activation functions and creating the metric space for the activation functions based on the distance metric; and
- combining the fisher information matrix eigenvalues with the activation function outputs to accurately predict the performance of the activation functions.

9. The method as claimed in claim 8, wherein the step of combining the fisher information matrix eigenvalues with the activation function outputs comprises:
- sampling the activation function outputs across a range of input values to understand shape of the activation functions;
- obtaining a vector of expected activation function outputs by randomly sampling the input values;
- measuring Euclidean distance between two activation functions of the activation functions to measure dissimilarity of their shapes to obtain activation function output values; and
- combining the fisher information matrix eigenvalues and the activation function output values to create the metric space, the metric space serves as a surrogate space enabling identification of optimal activation functions.

10. The method as claimed in claim 1, wherein the step of optimizing the activation functions based on the metric space comprises employing UMAP to:
- analyze patterns and groupings of the activation functions in the created metric space that perform similarly;
- identify clusters of activation functions exhibiting diversity in behaviors and varied performances; and
- determine number of features of the activation functions to be combined for yielding better results.

11. The method as claimed in claim 1, wherein the step of determining characteristics of the optimized activation functions comprises determining similarity in shapes of the optimized activation functions, determining essential information required to forecast performance of the optimized activation functions accurately, and distilling intricacies of multi-dimensional feature vectors associated with the optimized activation functions into a streamlined 2D representation.

12. The method as claimed in claim 1, wherein the real-world tasks comprise medical imaging including diagnosing diseases and interpreting x-rays, MRIs, and CT scans, autonomous vehicles including identifying pedestrians, vehicles, and road signs, retail including identifying products to manage inventory, agriculture including identifying crop growth, diseases, and optimal harvest time, face recognition including recognition in airports and in mobile phones.

13. A system for optimizing activation functions in neural networks, the system comprising:
- a memory storing program instructions;
- a processor executing instructions stored in the memory; and
- an activation function optimization engine and configured to:
- create activation function benchmark datasets by training one or more neural network architectures with a plurality of activation functions;
- identify one or more features indicative of performance of the activation functions in the activation benchmark datasets;
- create a metric space by analyzing the identified features of the activation function in the benchmark datasets, wherein the metric space is a low-dimensional representation of the activation functions, is representative of informative features associated with the activation functions and have a predefined distance metric;
- optimize the activation functions based on the metric space by employing dimensionality reduction techniques to visualize the metric space, wherein clusters of high performing activation functions are segregated from poorly performing activation functions;
- determine characteristics of the optimized activation functions which are predictive of performance of feature sets of the optimized activation function in each of the activation function dataset; and
- select activation functions from the optimized activation functions based on the determination, wherein the selected activation functions are applied to improve real-world tasks carried out by neural networks.

14. The system as claimed in claim 13, wherein the activation function optimization engine comprises a benchmark dataset generation unit executed by the processor and configured to create the activation function benchmark datasets, the activation function benchmark datasets comprise results obtained through the training of the neural network architectures for various tasks and are indicative of performance of the activation functions on specific tasks carried out by the neural network architectures, the neural network architectures comprise convolutional, residual, and vision transformer architectures, and wherein the activation function datasets facilitate analysis of activation function properties.

15. The system as claimed in claim 14, wherein the benchmark dataset generation unit creates the activation function datasets comprising 'Act-Bench-CNN' activation benchmark dataset which comprises training results for a plurality of activation functions when paired with convolutional neural network for tasks associated with image dataset including CIFAR-10, 'Act-Bench-ResNet' activation benchmark dataset which comprises training results for a plurality of activation functions when paired with residual neural network for tasks associated with CIFAR-10, and 'Act-Bench-ViT' activation benchmark dataset which comprises training results for a plurality of activation functions when paired with MobileViTv2-0.5 neural network for tasks associated with Imagenette.

16. The system as claimed in claim 13, wherein the activation function optimization engine comprises a characterization unit executed by the processor and configured to extract features from the created activation function benchmark datasets and perform characterization of the extracted features to identify the features of the activation functions, the identified features comprise fisher information matrix and activation function outputs.

17. The system as claimed in claim 16, wherein the characterization unit identifies the features by evaluating features hypothesized to be indicative of performance of the activation functions in the created activation function datasets by employing UMAP technique to identify the one or more features which are highly indicative of performance of the activation functions.

18. The system as claimed in claim 13, wherein the activation function optimization engine comprises a metric space construction unit executed by the processor and configured to combine the fisher information matrix and activation function outputs to create the metric space, the fisher information matrix aids in understanding working, ability to learn and predict, stability of neural networks and the activation function outputs represent the output distribution of the activation function benchmark datasets which is indicative of shape of an activation function which defines how the activation function reacts to different input values that impacts the neural network's ability to handle complex patterns and make predictions, and wherein the metric space is created for computing distances between the plurality of activation functions.

19. The system as claimed in claim 18, wherein the metric space construction creates the matrix space by:
- calculating fisher information matrix eigenvalues which are used to filter out the poorly performing activation functions, the calculation is carried out by computing a distance metric between different fisher information matrix eigenvalues which measures similarity between two activation functions of the activation functions and creating the metric space for the activation functions based on the distance metric; and
- combining the fisher information matrix eigenvalues with the activation function outputs to accurately predict the performance of the activation functions.

20. The system as claimed in claim 19, wherein the metric space construction unit combines the fisher information matrix eigenvalues with the activation function outputs by:
- sampling the activation function outputs across a range of input values to understand shape of the activation functions;
- obtaining a vector of expected activation function outputs by randomly sampling the input values;
- measuring Euclidean distance between two activation functions of the activation functions to measure dissimilarity of their shapes to obtain activation function output values; and
- combining the fisher information matrix eigenvalues and the activation function output values to create the metric space, the metric space serves as a surrogate space enabling identification of optimal activation functions.

21. The system as claimed in claim 13, wherein the activation function optimization engine comprises a dimension reduction unit executed by the processor and configured to employ Uniform Manifold Approximation and Projection (UMAP) as the dimensionality reduction technique to create visual representation of the metric space.

22. The system as claimed in claim 13, wherein the dimension reduction unit employs UMAP to analyze patterns and groupings of the activation functions in the created metric space that perform similarly; identify clusters of activation functions exhibiting diversity in behaviors and varied performances; and determine number of features of the activation functions to be combined for yielding better results.

23. The system as claimed in claim 13, wherein the activation function optimization engine comprises an activation function evaluation unit executed by the processor and configured to determine the characteristics of the optimized activation functions by determining similarity in shapes of the optimized activation functions, determining essential information required to forecast performance of the optimized activation functions accurately, and distilling intricacies of multi-dimensional feature vectors associated with the optimized activation functions into a streamlined 2D representation.

24. The system as claimed in claim 13, wherein the real-world tasks comprise medical imaging including diagnosing diseases and interpreting x-rays, MRIs, and CT scans, autonomous vehicles including identifying pedestrians, vehicles, and road signs, retail including identifying products to manage inventory, agriculture including identifying crop growth, diseases, and optimal harvest time, face recognition including recognition in airports and in mobile phones.

25. A computer program product comprising:
- a non-transitory computer-readable medium having computer program code stored thereon, the computer-readable program code comprising instructions that, when executed by a processor, causes the processor to:
- create activation function benchmark datasets by training one or more neural network architectures with a plurality of activation functions;
- identify one or more features indicative of performance of the activation functions in the activation benchmark datasets;
- create a metric space by analyzing the identified features of the activation function in the benchmark datasets, wherein the metric space is a low-dimensional representation of the activation functions, is representative of informative features associated with the activation functions and have a predefined distance metric;
- optimize the activation functions based on the metric space by employing dimensionality reduction techniques to visualize the metric space, wherein clusters of high performing activation functions are segregated from poorly performing activation functions;
- determine characteristics of the optimized activation functions which are predictive of performance of feature sets of the optimized activation function in each of the activation function dataset; and
- select activation functions from the optimized activation functions based on the determination, wherein the selected activation functions are applied to improve real-world tasks carried out by neural networks.

* * * * *